United States Patent
Raymond

(10) Patent No.: US 7,823,822 B2
(45) Date of Patent: Nov. 2, 2010

(54) SYSTEM AND METHOD TO ALIGN REFINER PLATES DURING INSTALLATION ON A DISC

(75) Inventor: Yves Raymond, Milton, PA (US)

(73) Assignee: Andritz Inc., Glens Falls, NY (US)

( * ) Notice: Subject to any disclaimer, the term of this patent is extended or adjusted under 35 U.S.C. 154(b) by 207 days.

(21) Appl. No.: 11/757,629

(22) Filed: Jun. 4, 2007

(65) Prior Publication Data
US 2008/0025814 A1    Jan. 31, 2008

Related U.S. Application Data

(60) Provisional application No. 60/820,620, filed on Jul. 28, 2006.

(51) Int. Cl.
*B02C 7/12* (2006.01)
(52) U.S. Cl. .................... 241/298; 241/261.2
(58) Field of Classification Search ............. 241/261.2, 241/261.3, 296, 297, 298
See application file for complete search history.

(56) References Cited

U.S. PATENT DOCUMENTS

| | | | |
|---|---|---|---|
| 2,006,525 A * | 7/1935 | Thal | 411/80.5 |
| 2,348,293 A * | 5/1944 | Hamer | 384/295 |
| 4,750,681 A * | 6/1988 | Sawant et al. | 241/208 |
| 5,890,665 A * | 4/1999 | Arasmith et al. | 241/55 |
| 7,472,854 B1 * | 1/2009 | Bird | 241/92 |
| 2002/0166912 A1 * | 11/2002 | Schneid | 241/298 |
| 2005/0058375 A1 * | 3/2005 | Ma | 384/276 |

FOREIGN PATENT DOCUMENTS

EP    1 630 281 B1    9/2007

* cited by examiner

*Primary Examiner*—Mark Rosenbaum
(74) *Attorney, Agent, or Firm*—Nixon & Vanderhye P.C.

(57) ABSTRACT

A bushing to assist in positioning a bolt in the bolt apertures of refining plates and disk. The bushing is a cylindrical sleeve that slides over the bolt shaft, before the bolt is inserted into the aperture. The bushing may be short relative to the length of the bolt and the aperture. The bushing fits between the bolt and aperture in the refining plate and/or disk, as the bolt engages the threads of the plate and/or disk. The bolt is centered in the aperture and the centered bolt ensures that the plate segment is properly positioned on the disk as the bolt fastens the segment to the disk.

15 Claims, 5 Drawing Sheets

SYSTEM AND METHOD TO ALIGN REFINER PLATES DURING INSTALLATION ON A DISC

This application claims the benefit of U.S. Provisional Application 60/820,620, filed Jul. 28, 2006, the entirety of which is incorporated by reference herein.

BACKGROUND OF THE INVENTION

This invention relates to refiners and disk mills (hereafter referred to as refiners) and particularly to attachment devices to secure refiner plate segments to a disk for securing the segments to the refiner.

Refiner plate segments are arranged on a disk in an annular array to form a completed refiner plate. Refiner plates are mounted on opposing disks, cones or cylinders (hereafter collectively referred to as disks and plate holders) rotating relative to one another. A small gap is formed between the opposing refining plates. It is within this gap that lingocellulose fibers or other material is worked. The gap is a refining zone.

The refining plate segments are assembled on annular and/or conical disks, and comprise a refiner plate. As the plate segments become worn or damaged, they are periodically replaced.

In general plate segments are mounted on disks rotating relative to each other, which could be achieved by the presence of one rotor and one stator (single disk refiner), or by one rotor segmented on both sides and operating against two stators (or twin refiner), or by several rotors working against each other and a pair of stators (multi disk refiner), or by counter-rotating disks (double disk).

Refiner plates are intended to be balanced when installed on a disk. To provide for this balance, the plate segments are set during manufacture to minimize vibration of the refiner rotating assembly. When installed on a disk, the individual segments are preferably mounted in the same relative position on the rotating disk as when balanced during manufacturing. The sequence of the installed segments on the disk should be the same as when balanced. If the segments are not mounted in the same relative position as set during manufacturing, the balance of the entire rotor assembly is degraded resulting in vibration and potential damage to the refiner. The proper sequential positioning of the segments is accomplished by numbering the segments in clockwise or counterclockwise order when balanced so that they may be installed in the same order.

In addition, the radial and angular positioning of individual plate segments on the rotating disk surface is preferably precisely reproduced. The proper radial positioning of plate segments is relatively simple if the rotating disk has a precision machined retaining lip that abuts against the outer edge of each refiner plate segment. During installation, each segment is positioned on the disk against the retaining lip before being fastened to the disk. During operation, the centrifugal force of the rotating assembly biases the segments against the retaining lips to hold the segments in proper radial positions.

There is a long felt need to provide an improved means for precision angular positioning of each plate segment. The plate mounting surface on the refiner disk is without features for precision angular alignment of segments, other than the threaded holes in the disk for the plate mounting bolts. The approximate angular location of each plate segment is determined by the mounting screws which pass through mounting holes in each segment and fasten into these threaded holes in the disk. However, casting tolerances require that the clearance in the holes in each segment be relatively large in comparison to the mounting bolts. The result is that the mounting bolts do not fix the location of each segment on a disk precisely. The angular position of a segment on a disk can vary by as much as the clearance between the screw and the hole in the segment.

In addition, refiner plates are typically manufactured with a clearance, e.g., a gap, between adjacent segments. This clearance is required for the segments to be installed and removed. In addition, the clearances between segments can be cumulative such that the gap between two segments on a disk can be much greater than the design clearance between segments. If, for example, the mounting surface of the disk is vertical, a typical installation procedure is to install the first segment at the six o'clock position and then install segments at the five o'clock and seven o'clock positions, then continuing up on both sides until the last segment is installed at the twelve o'clock position. As each segment is installed, its weight causes it to rest against the segment below it (to the limit allowed by the clearance between the bolt hole and bolt in each segment). The worse-case result of installing all of the segments in this manner is that there is no gap between the segments at the bottom of the disk and all the clearance accumulates between the top two segments. Such an uneven distribution of segments around the disk causes a significant degradation of the balance of the set of segments and, consequently, of the entire rotating assembly. In view of the gap between adjacent segments and the clearance between bolts and bolt holes, the angular position of the segments may vary such that it can significantly affect the balance of the set of plates.

To compensate for segment clearances, the conventional procedure is to use shims between adjacent segments to equalize the spacing between all segments. The shims are positioned adjacent a side edge of an installed plate while an adjacent plate is being installed. The shims are used both while the circle is being balanced and also during installation in the refiner.

Shims are not helpful to mount the first plate segment on a plate holder. Shims are also difficult to retain between the sides of a mounted segment and a segment being mounted. Shims of varying thicknesses may be needed to balance the segments and then to mount the segments. The desired thickness of shims may vary depending on factors such as thermal expansion of a hot refiner disk. Time is wasted while adjusting the thickness of shims needed to evenly distribute the gap. Alternatively, the gaps between the last segments installed are allowed to remain larger or smaller than those first installed, resulting in a degraded balance quality.

Due to manufacturing tolerances, the width, or cord length of each segment within a circle can vary even though the sum total of the gaps between segments is held within some tolerance. If several of the wider (or narrower) segments within the set are next to each other in clockwise or counter clockwise order, and the clearance between the segments is distributed using equal thickness shims between adjacent segments. The use of shims may make it difficult to align the bolt hole in an individual segment to the corresponding threaded hole in the disk. On the other hand, it may not be possible to install segments using shims to maintain equal gaps between segments and simultaneously align the segment mounting holes with the plate threaded holes, at least to the extent required to install the mounting bolts.

Because of the problems identified above with the use of shims, there is a long felt need for improved devices and methods to mount refiner plate segments to plate holders. For example, there is a need for devices to align the first segment added to plate holder with respect to the plate holder while the segment is being fastened to the plate holder. Further, there is a long felt need for devices and methods to prevent or minimize angular shifts between a plate segment and plate holder/disk as the segment is being fastened to the holder/disk.

BRIEF DESCRIPTION OF THE INVENTION

A bushing has been developed to assist in positioning a bolt in the bolt apertures of refining plates and disk. The bushing is a cylindrical sleeve that slides over the bolt shaft, before the bolt is inserted into the aperture. The bushing may be short relative to the length of the bolt and the aperture. The bushing fits between the bolt and aperture in the refining plate and/or disk, as the bolt engages the threads of the plate and/or disk. The bolt is centered in the aperture and the centered bolt ensures that the plate segment is properly positioned on the disk as the bolt fastens the segment to the disk.

A fastener has been developed for securing a refiner plate segment to a refiner plate holder or refiner disk, the fastener comprising: a shaft having an attachment surface for engaging an aperture of the holder or disk, a bushing adapted to form a sleeve over the shaft, wherein the bushing slides between the bolt and a smooth surface of an aperture in the plate segment. Alternatively, a fastener for securing a refiner plate segment to a refiner plate holder or refiner disk, the fastener comprising: a shaft having an attachment surface for fastening to a plate segment, a bushing adapted to form a sleeve over the shaft, wherein the bushing slides between the bolt and a smooth surface of an aperture in the refiner disk.

A refiner plate holder assembly has been developed comprising: a refiner plate holder having a first surface to receive at least one refiner plate; the at least one refiner plate including an aperture; a fastener including a shaft having an attachment surface for fastening to a plate segment, and a bushing adapted to form a sleeve over the shaft, wherein the bushing slides between the bolt and a surface of an aperture in the refiner plate holder.

A method has been developed for fastening a refiner plate segment to a refiner plate holder, the method comprising: positioning the refiner plate segment on the plate holder such that an aperture in the plate segment is aligned with a corresponding aperture in the plate holder; placing a bushing over a shaft of a fastener, such that the bushing is coaxial with the shaft; inserting the shaft of the fastener into aperture of the plate segment and the corresponding aperture of the plate holder, wherein the bushing is on the fastener during the insertion, and seating the bushing on a surface of at least one of the aperture in the plate segment and the corresponding aperture in the plate holder.

DETAILED DESCRIPTION OF THE INVENTION

Figure 1:
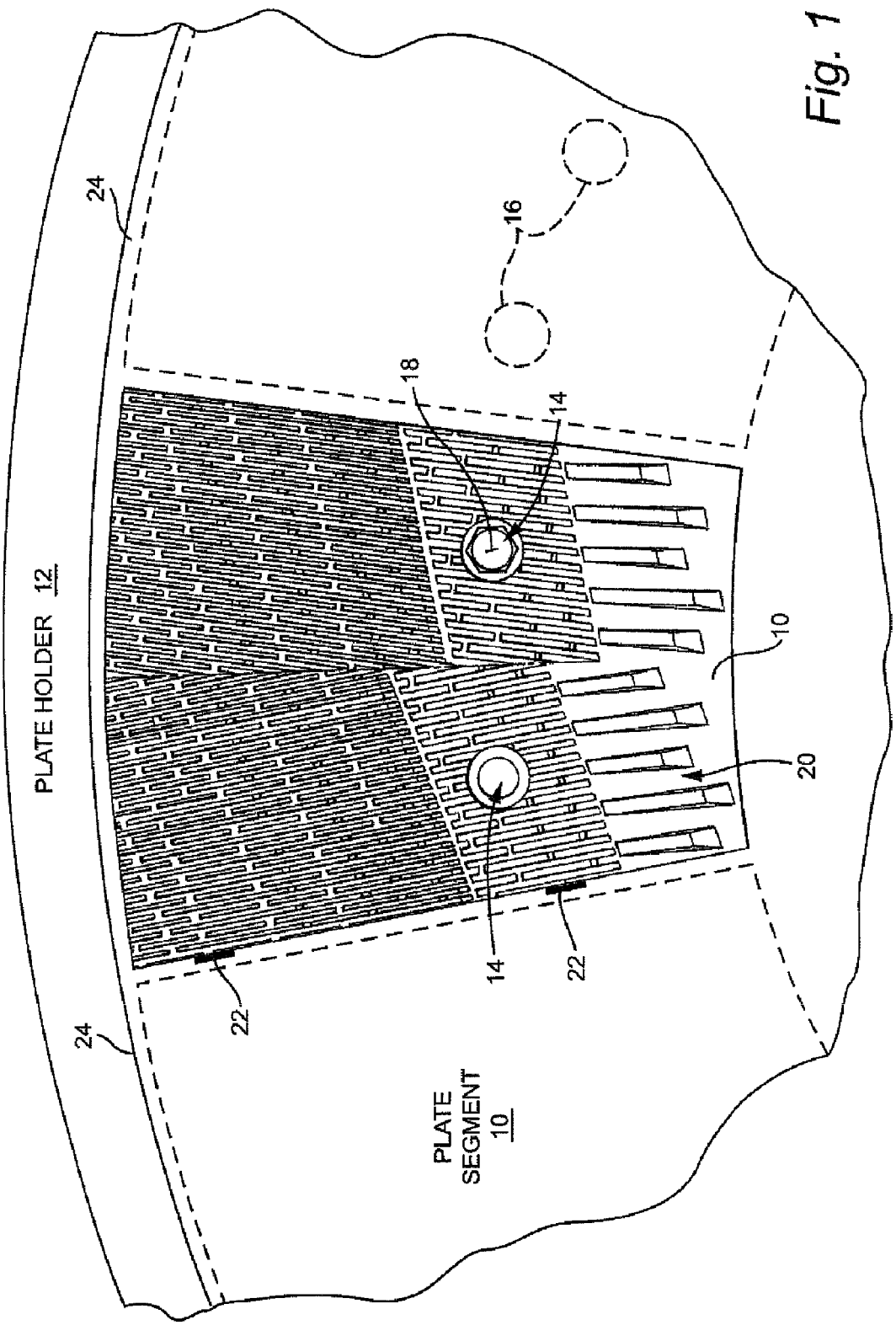
FIG. 1 is a front view of an exemplary refiner plate segment having a bolt hole for attachment to a supporting disk.

FIG. 1 is a front view of a refining plate segment 10 which may be attached to a plate holder 12, e.g., a circular disk, by bolts or other attachment. The refining plate segment has bolt apertures 14 to receive a bolt that is secured to the disk. A corresponding aperture 16 in the plate holder may be threaded to engage the threaded shaft of a bolt 18.

A refining plate segment 10 typically has a general plan view shape of a truncated sector of a circle. The segment 10 may include a surface having an arrangement of bars and channels 20 extending generally radially across a face of the segment. The bars and channels mechanically pulse wood chips and other pulp, as the chips and pulp flow in a slurry through a clearance, e.g. gap, between opposing refining plate surfaces. The pulsation separate individual fibers from the wood and pulp.

Plate segments 10 are arranged side by side to form an annular plate mounted on the plate holder 12. The array of segments are disposed on and attached to the plate holder 12, e.g., a refining disk. The segments are typically secured side by side to the plate holder. Shims 22 may or may not be used to assist in mounting the segments to the plate holder and/or in balancing the mounted segment. The plate holder with the array of segments form a base, e.g., a rotor or stator, to form the refining plate. An annular positioning lip 24 on the plate holder abuts against an outer edge of the segments to align the segment radially on plate holder.

The bolt apertures 14 in the segments 10 each have a corresponding aperture 16 in the plate holder. The aperture 16 in the plate holder may include a threaded hole. Typically, either the plate or plate holder will have threaded apertures, and the bolt is initially inserted in the aperture that is not threaded. Alternatively, the bolt may extend through both plate and plate holder and be fastened with an nut on the reverse side. Accordingly, the bolt is inserted into the face of the plate segment with the bars and grooves (as shown in FIG. 1) to engage the threads of the aperture 16 in the plate holder. Alternatively, the plate holder may have smoothed walled, conical apertures and the backside of the plate segments may have threaded apertures such that the bolt is inserted through the back of the plate holder and screwed into the apertures of the plate segment.

Figure 2:
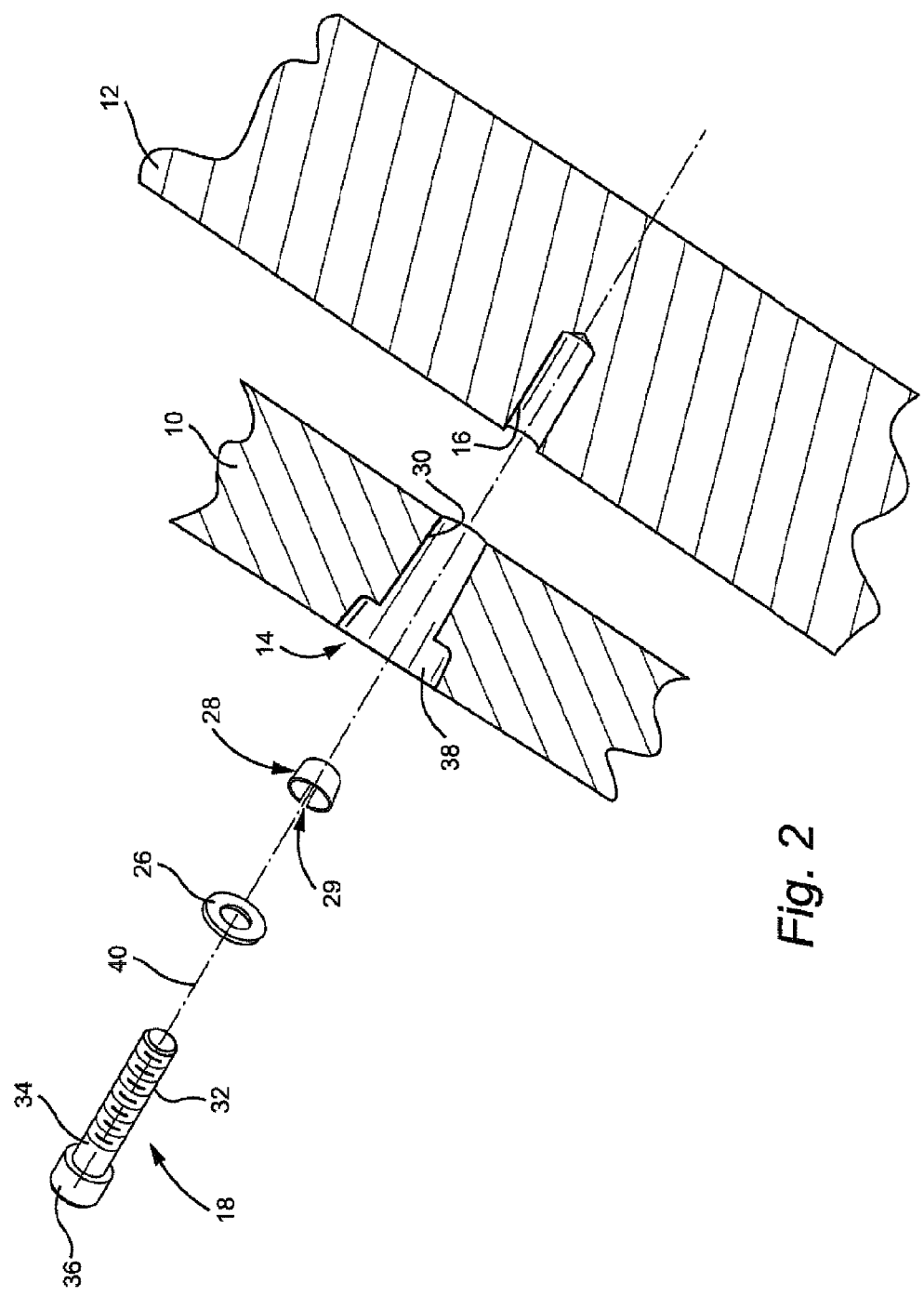
FIG. 2 is an exploded view of a bolt, bushing to slide over the threaded bolt shaft and tapered bolt hole of a plate segment and/or disk.

FIG. 2 is an exploded side view of a bolt 18, annular washer 26, bushing 28, cross section of a plate segment 10 with an aperture 14 having a frustoconical, smooth wall surface 30, and a cross section of a plate holder 12 with an aperture 16 having a cylindrical cavity with threaded wall surfaces. The bolt may be a conventional bolt or other such fastener used to secure plate segments to plate holders. The bolt 18 may include a threaded portion 32 of a shaft, a smooth surface ring 34 portion of the shaft, and a head 36. The washer 26 fits over the bolt shaft and seats against the head of the bolt and in an annular recess 38 in the plate segment that is coaxial with the aperture 14.

The bushing 28 slides over the shaft to form a sleeve over a portion of the bolt shaft near the head, e.g., over the ring portion. The bushing need not extend over the threaded portion of the bolt shaft that will engage the threads of the aperture 16 in the plate holder. The wide end of the bushing faces the head 36 of the bolt and the narrow end of the bushing faces the threads 32 of the bolt because the bolt 18, washer 26 and bushing 28 assembly are inserted into aperture 14 of the plate.

The bushing 28 may be a ductile hollow cylinder that may include a lateral gap 29 extending the length of the bushing. The bushing may have a first end with an inside diameter thinner than an inside diameter of an opposite end, and the opposite end of the bushing has an outside diameter wider than an outside diameter of the first end. The bushing may be of a soft metal such as copper, a plastic such as Teflon™, or a fibrous material such as a MDF (medium density fiber) sheet. Preferably the bushing is a material, e.g., MDF, that readily degrades and can be adsorbed into the refiner pulp stream without contaminating the stream. Alternatively, the bushing is a material, e.g., a metal, that can be easily removed from the pulp stream with an existing containment removal process already in the refiner process.

The bushing material, metal, plastic or fibrous material, is preferably soft and ductile, especially relative to the material of the bolt and refiner plate. The soft, ductile properties allow the bushing to deform and fill in the voids between the bolt and plate bolt hole. The bushing should be sufficiently hard such that the bolt remains centered in the segment aperture 14 until the bolt is tightened and the installation of the segment is finished.

The bushing 28 centers the bolt in the apertures 14 and/or 16 as the bolt is inserted and screwed into the threaded aperture of the plate holder or plate segment. The bushing 28 assists in precisely aligning the bolt in the smooth walled aperture. This alignment of the bolt in the aperture assists in aligning each segment in an angular direction on the plate holder. By improving the angular alignment of the plate segment, enhanced high balance of the plate segments and refiner plate assembly as installed in a refiner is achieved. Further, the bushing 28 may allow for the elimination of shims for use in mounting segments on plate holder.

The bolt 18 slides through the aperture 14 in the plate segment and screws into the plate holder aperture 16. The aperture 14 in the plate segment may be slightly larger in diameter than the diameter of the bolt shaft to allow the bolt to slide through. The gap between the bolt shaft and aperture 14 allows the segment to shift slightly as the bolt is fastened to the plate holder. This shift may cause the segment to become misaligned with respect to the plate holder. To avoid misalignment, the bushing 28 on the bolt shaft centers the bolt in the aperture of the segment. Once the bolt is tightened into the apertures, the plate segment is prevented from shifting with respect to the plate holder by the torque applied by the bolt. The bushing is not needed to align the bolt and plate segment after the bolt has been tightened in the apertures.

Figure 4:
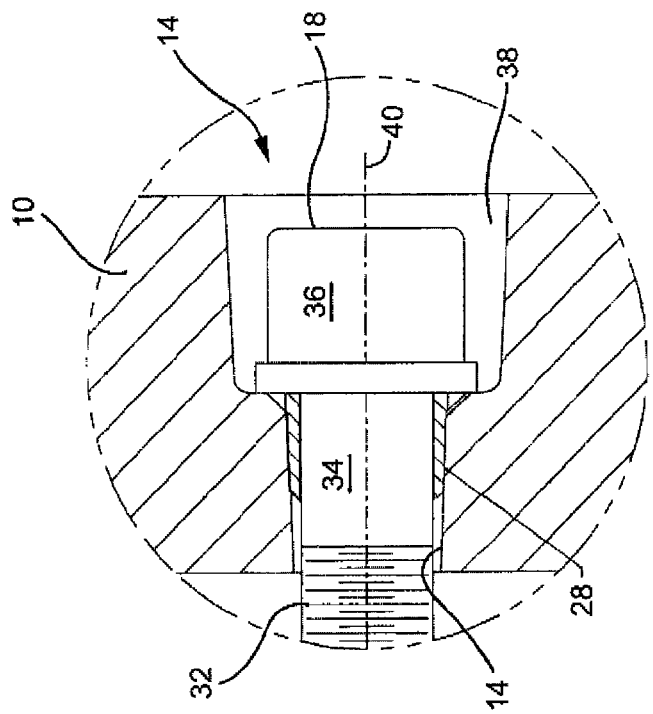
FIG. 4 is an enlarged view of the cross-section shown in FIG. 3.
Figure 3:
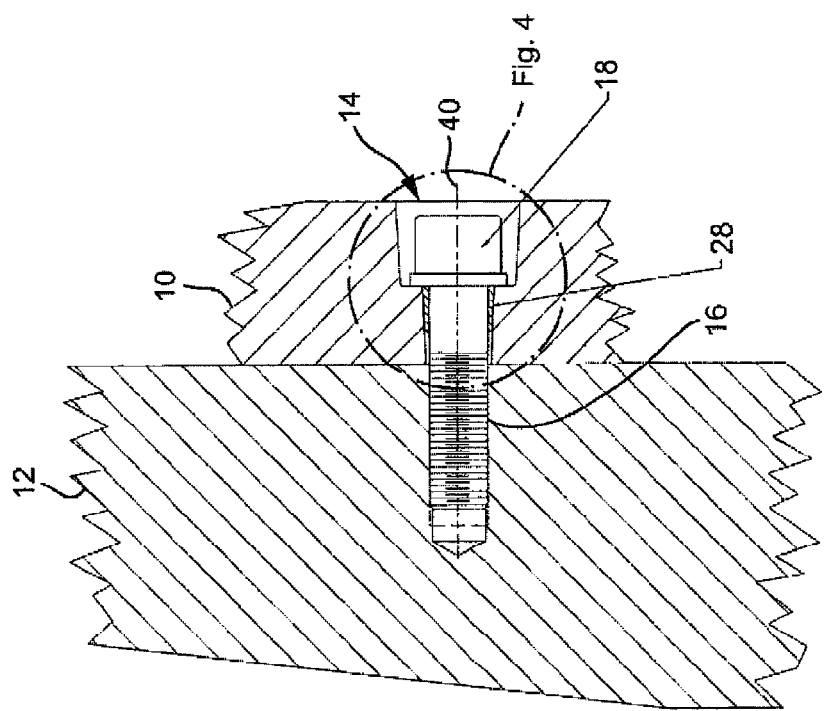
FIG. 3 is a cross-sectional diagram showing a bolt inserted into the aperture of a plate segment and a plate holder.

FIGS. 3 and 4 are cross-sectional diagrams showing the bolt 18 inserted into coaxial apertures 14, 16 of a plate segment 10 and a plate holder 12, respectively. FIG. 3 is an enlarged view of FIG. 4. As the bolt is inserted into the apertures the bushing 28 is compressed between the outside surfaces of the bolt shaft, e.g., ring surface 34, and the frustoconical inside surface of the aperture 14 in the plate segment. The bushing outside diameter is sufficiently narrow to fit into aperture 14. The bushing fits snuggly between the walls of aperture 14 and the bolt shaft. The compression of the bushing forces the bolt to be properly aligned with the center axis 40 of the segment aperture 14. As the bolt extends into the aperture 14, the gap 29 (FIG. 2) in the bushing closes shut. The bushing is compressed further between the bolt shaft and the frustoconical wall of the aperture 14. The bushing is sufficiently small and deformable to be compressed by the bolt shaft into the frustoconical aperture 14 without interfering with fixing the plate segment to the disk.

In addition, since refiner plates are most frequently installed with two or more mounting screws, the hole-to-hole distance in the segment is subject to casting tolerances and therefore will vary somewhat from the corresponding hole-to-hole distances on the disk. The bushings or sleeves should be sufficiently compliant to accommodate the tolerances of hole-to-hole distances.

Figure 7:
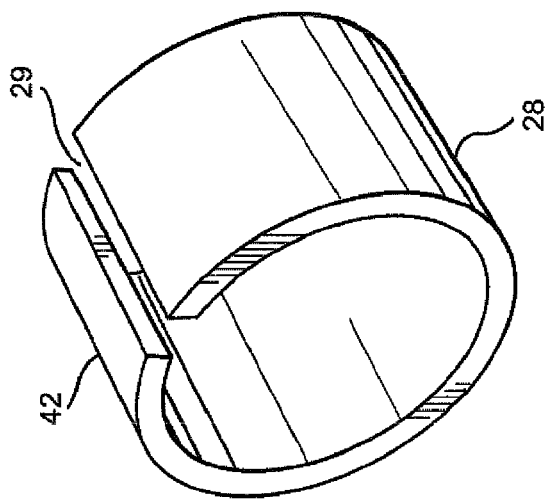
FIGS. 5 to 7 are an end view, side view and a perspective view, respectively, of a bushing.
Figure 6:
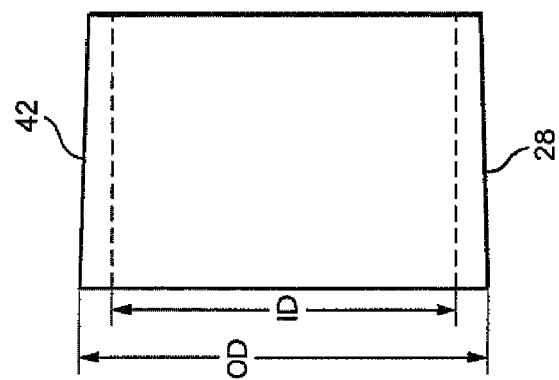
Figure 5:
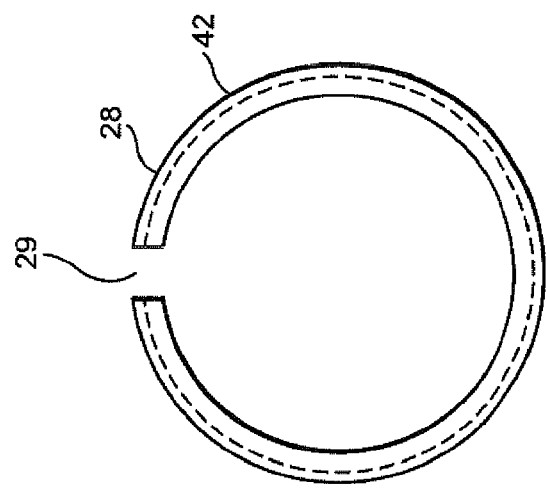

FIGS. 5 to 7 are end, side and perspective views, respectively, of a bushing 28. The bushing 28 may have a length that is equal to or less than the thru-hole 14 in the refiner plate. The inside diameter (ID) of the bushing may be equal to or slightly greater than the diameter of the bolt shaft. The outside diameter (OD) of the bushing may be equal to or slightly less than the inside diameter of a smooth walled aperture 14 in a refiner plate or a smoothed walled aperture 16 in a plate holder.

The outside diameter (OD) of the bushing 28 may be cylindrical or tapered. The outer wall 42 may be tapered especially if the bolt aperture 14 in the refiner plate is slightly tapered, such as due to the taper required on foundry patterns. The taper on the bushing assists to start the bushing into the aperture and to align the bolt shaft as it enters the aperture 16 in the plate holder. The gap 29 in the bushing is optional and may assist in allowing the bushing to conform to the bolt aperture as the bushing is drawn into the aperture by the mounting bolt.

Figure 8:
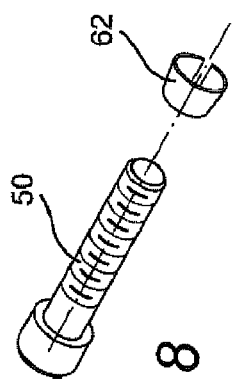
FIG. 8 is a perspective view of a bolt and bushing.
Figure 10:
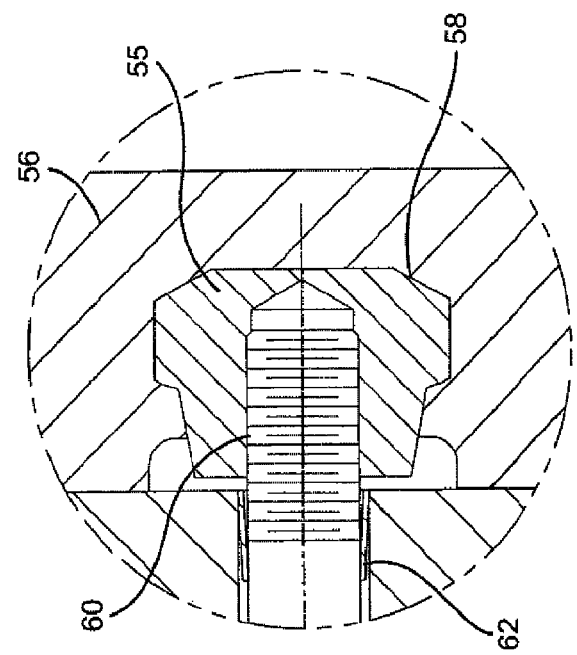
FIG. 10 is an enlarged view of FIG. 9 showing plate holder, segment and bolt.
Figure 9:
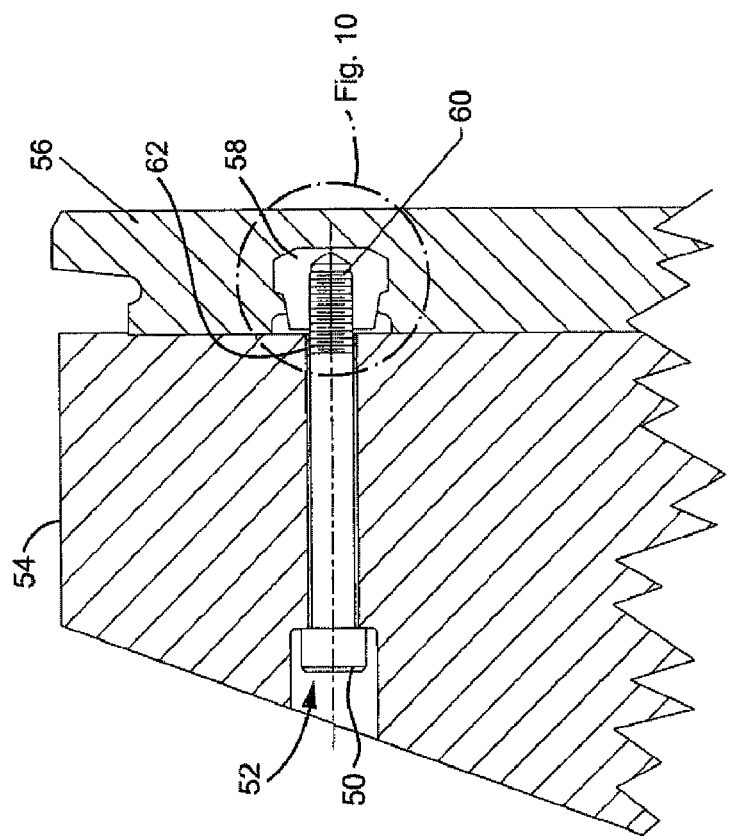
FIG. 9 is a side cross-sectional view of a plate holder and segment with a bolt and bushing.

FIGS. 8, 9 and 10 show an alternative plate segment fastener arrangement in which a bolt 50 slides through a smooth walled cylindrical aperture 52 in a refiner disk 54 and engages a threaded nut 55 in a refiner plate segment 56. The nut is seated in a recess 58 in the plate segment. The threaded shaft 60 of the bolt 50 screws into the nut and applies a compressive force between the refiner plate and plate disk. As the bolt is turned into the nut, a bushing 62 forms a sleeve over a portion of the bolt shaft.

The bushing 62 may be similar in shape and materials as the bushing 28 described above. The bushing is slid over the threaded end of the bolt 50, after the bolt shaft is inserted into aperture 52 and the threaded end of the bolt extends through the disk 54. The narrow end of the bushing is slid first over the threaded end of the bolt shaft 60 to facilitate insertion of the bushing in aperture 52 and the wide end of the bushing faces the threaded end of the bolt. The bushing fits snugly between the bolt shaft 60 and the inner sidewall of the aperture 52 in the refiner disk 54. The bushing centers the bolt in the aperture 52 as the bolt is screwed into the nut 55.

Potential benefits of the bushing alignment system include: (i) improved balance quality of the rotating assembly since each segment is more accurately and repeatably positioned in the angular direction, (ii) faster, simpler plate installation since no shims are required; (iii) positioning each segment on the disk independent of the other segments, and (iv) faster, simpler methods of balancing refiner plates may be used, e.g., without the use of shims.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fastener and bushing assembly in combination with a refiner plate segment and a refiner plate holder or refiner disk in a refiner, the fastener and bushing assembly comprising:
    a shaft of a fastener having an attachment surface for engaging an aperture of the refiner plate holder or refiner disk, and
    a tapered bushing having a first mode in which the bushing forms a sleeve over the shaft, wherein the bushing slides between the shaft and a smooth surface of a tapered aperture in the plate segment and the tapered bushing is formed of a material which is more ductile and more deformable than a material forming the refiner plate segment, wherein the bushing has a second mode in which the bushing is destroyed or degraded, and enters a flow of material passing through the refiner.

2. A fastener and bushing assembly as in claim 1 wherein the tapered bushing is conical.

3. A fastener and bushing assembly as in claim 2 wherein the tapered bushing is split along a longitudinal line such that a longitudinal gap exists in the bushing.

4. A fastener and bushing assembly as in claim 1 wherein the tapered bushing is metallic.

5. A fastener and bushing assembly as in claim 1 wherein the tapered bushing has a first end with an inside diameter thinner than an inside diameter of an opposite end, and the opposite end of the bushing has an outside diameter wider than an outside diameter of the first end.

6. A fastener and bushing assembly as in claim 1 wherein the tapered bushing has one end abutting an inside surface of the aperture and an opposite end abutting the shaft.

7. A fastener and bushing assembly as in claim 1 wherein the tapered bushing includes a sidewall and a thickness of the sidewall is tapered along a length of the bushing.

8. A refiner plate holder assembly for a refiner, the assembly comprising:

a refiner plate holder having a first surface to receive at least one refiner plate;

the at least one refiner plate including a tapered aperture;

a fastener including a shaft having an attachment surface for fastening to a plate segment, and a tapered bushing adapted forming a sleeve over the shaft, wherein the tapered bushing slides between the bolt and a surface of the tapered aperture in the refiner disk, wherein the tapered bushing is formed of a ductile material more ductile and more deformable than a material forming the at least one refiner plate, and wherein the bushing is degraded or destroyed, and enters a flow of material passing through the refiner.

9. A refiner plate holder assembly as in claim 8 wherein the tapered bushing has one end abutting an inside surface of the aperture and an opposite end abutting the shaft.

10. A refiner plate holder assembly as in claim 8 wherein the tapered bushing is conical.

11. A refiner plate holder assembly as in claim 8 wherein the tapered bushing is split along a longitudinal line such that a longitudinal gap exists in the bushing.

12. A refiner plate holder assembly as in claim 8 wherein the tapered bushing is metallic.

13. A refiner plate holder assembly as in claim 8 wherein the tapered bushing has a first end with an inside diameter thinner than an inside diameter of an opposite end, and the opposite end of the bushing has an outside diameter wider than an outside diameter of the first end.

14. A refiner plate holder assembly as in claim 8 wherein the tapered bushing centers the shaft in the tapered aperture.

15. A refiner plate holder assembly as in claim 8 wherein the tapered bushing includes a sidewall and a thickness of the sidewall is tapered along a length of the bushing.

* * * * *